United States Patent [19]

Greene

[11] 4,071,047
[45] Jan. 31, 1978

[54] FLUID SWITCH

[75] Inventor: Sanford I. Greene, Hollywood, Fla.

[73] Assignee: Micro Pneumatic Logic Inc., North Miami Beach, Fla.

[21] Appl. No.: 618,015

[22] Filed: Sept. 30, 1975

[51] Int. Cl.² .................. F16K 3/36; F16K 11/06
[52] U.S. Cl. .................. 137/625.18; 137/625.48; 251/138
[58] Field of Search ........... 137/625.25, 625.48, 137/625.18, 625.68; 251/321, 324, 325, 138, 238, 329; 84/388

[56] References Cited

U.S. PATENT DOCUMENTS

| 901,586 | 10/1908 | Brady | 251/321 |
|---|---|---|---|
| 2,259,756 | 10/1941 | Lindsay | 84/388 |
| 2,750,962 | 6/1956 | Kreitchman et al. | 137/625.48 |
| 2,979,080 | 4/1961 | Hewitt | 137/625.68 |
| 3,025,712 | 3/1962 | Spar et al. | 137/625.48 X |
| 3,150,517 | 9/1964 | Kuffer et al. | 137/625.18 X |
| 3,160,015 | 12/1964 | Charlton et al. | 137/625.68 X |
| 3,338,268 | 8/1967 | Houser et al. | 137/625.25 X |
| 3,350,058 | 10/1967 | Alden | 251/329 |
| 3,387,628 | 6/1968 | Flint et al. | 137/625.25 X |
| 3,570,540 | 3/1971 | McInnes et al. | 137/625.48 |
| 3,586,025 | 6/1971 | Blaiklock et al. | 137/82 |
| 3,625,252 | 12/1971 | Bermel et al. | 137/625.3 |
| 3,776,276 | 12/1973 | Stiltner | 137/625.48 X |

Primary Examiner—Arnold Rosenthal
Attorney, Agent, or Firm—Lewis H. Eslinger

[57] ABSTRACT

A fluid switch formed of a housing having at least one inlet port to which pressure is applied and at least one outlet port. An inlet conduit disposed within the housing is coupled at one end to an inlet port so that fluid flows therethrough in laminar flow. An outlet conduit is disposed within the housing and is aligned with the inlet conduit. One end of the outlet conduit is coupled to an outlet port. The other ends of the inlet and outlet conduits are spaced from each other by an amount which is less than the critical amount required for the laminar flow to change to turbulent flow. A piston having no fluid sealing means is disposed in the spacing between the conduits and includes a transverse fluid channel which is selectively aligned with the conduits in accordance with the displacement of the piston. An actuator is provided to exert a force on the piston so as to displace same.

9 Claims, 4 Drawing Figures

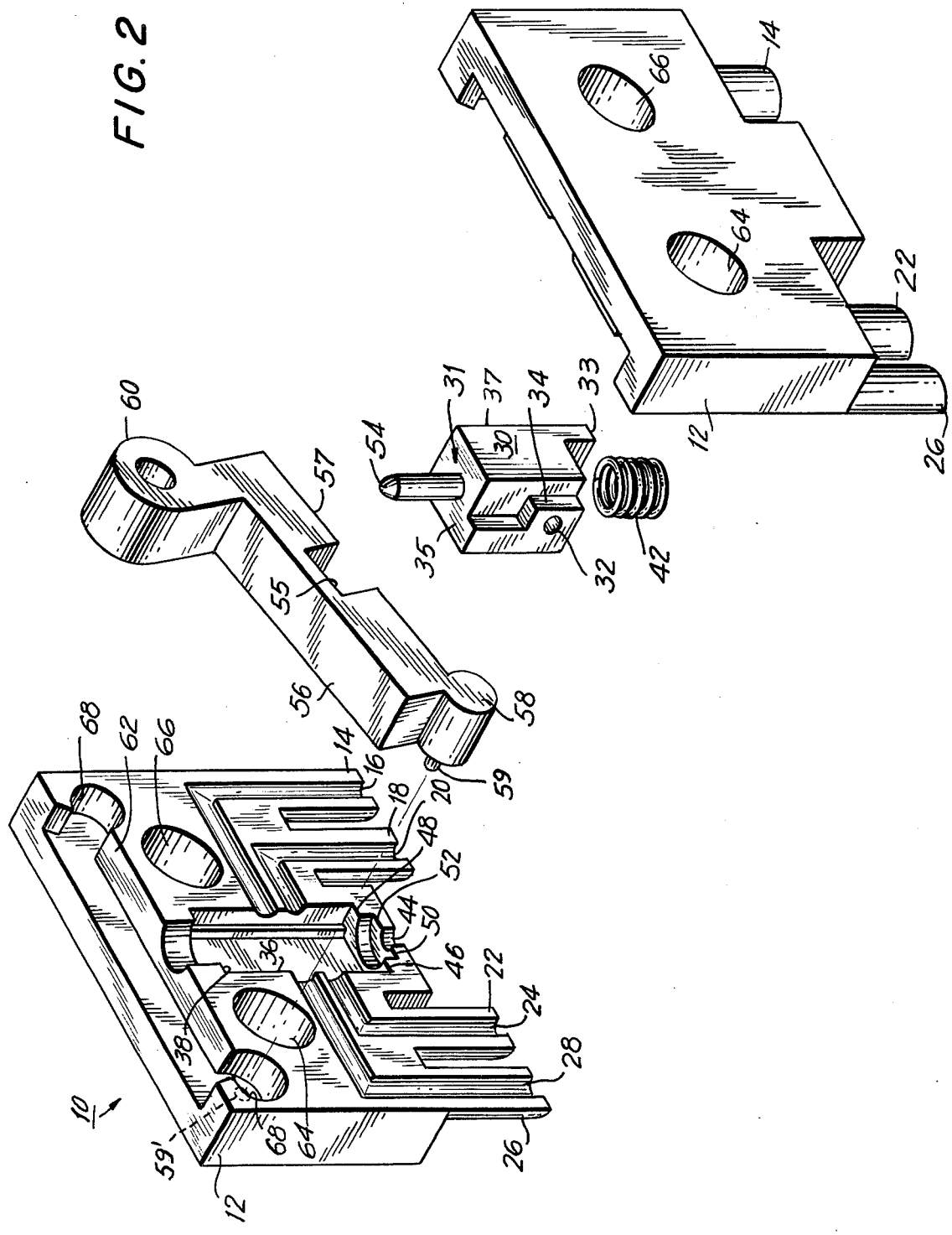

FLUID SWITCH

BACKGROUND OF THE INVENTION

This invention relates to a fluid switch and, more particularly, to a fluid switching element wherein inlet and outlet ports are selectively interconnected in response to external control.

Fluid switches long have been used to control the flow of fluid from a particular source to a destination. Thus, depending upon a particular function which is controlled and a performance which is to be executed, fluid flow can be selectively interrupted to achieve the controlled performance. Accordingly, fluid switches are analogous to electrical switches and, recently, have been used in fluid control systems to minimize power losses and construction costs which previously have been dependent upon the necessity of converting fluid parameters into electrical parameters in order to control the system.

With the advent of fluidic logic systems, it has become desirable to provide various fluidic devices which are analogous to corresponding electrical logic devices. For example, fluidic logic gates, latching elements and other switching elements can be directly disposed in a fluid system to accurately control the operation of that system without necessitating electrical control thereover. Since many fluidic control systems operate with relatively low pressure levels, it has become desirable to provide low-cost fluid switching elements which can operate with such low pressures.

Heretofore, it has been thought that optimum utilization of a fluid switching element required minimum leakage, and this condition could be attained only by providing positive sealing elements. Thus, in prior fluid switching elements wherein a valve has been used to selectively establish a fluid flow path, such valve was furnished with various sealing elements, such as O-rings, sealing gaskets, sealing gels, and the like. Unfortunately, the use of such positive sealing elements necessitates a relatively high force to be exerted upon the valve to attain a switching condition. The relatively high minimum actuating force which is required to operate such valves has, in turn, required the fluid operating system to be furnished with correspondingly high mechanical forces, and thus is subjected to high energy considerations.

There has been a long-felt need to minimize the energy requirements in a fluid operating system. Accordingly, the various fluid switching elements which can be used with such a fluid operating system should, advantageously, operate with relatively low pressures and, more importantly, should be actuated in response to very low actuating forces. Unfortunately, the requirement of positive sealing elements in such fluid switches has not permitted the desirably low actuating forces to be effective.

OBJECTS OF THE INVENTION

Therefore, it is an object of the present invention to provide an improved fluid switching element wherein the problems inherent in prior art devices are overcome.

Another object of this invention is to provide a fluid switching element which is actuated in response to very low minimum actuating forces.

Yet another object of this invention is to provide an improved fluid switch of novel construction wherein the actuating valve mechanism is free of positive sealing elements.

A still further object of this invention is to provide an improved low-pressure fluid switching element capable of performing various logic-type switching operations in response to a low actuating force exerted thereon.

A still further object of this invention is to provide an improved fluid switching element which finds ready application as a control device for use in a fluidic operating system.

Another object of this invention is to provide an improved fluid switch exhibiting high sensitivity, small size and low cost.

Various other objects and advantages of the present invention will become apparent from the ensuing detailed description, and the novel features will be particularly pointed out in the appended claims.

SUMMARY OF THE INVENTION

In accordance with the present invention, a fluid switching element is provided, comprising a housing having at least one inlet port and at least one outlet port; the inlet port being coupled to one end of an inlet conduit in which laminar flow occurs, and the outlet port being coupled to one end of an outlet conduit, the respective conduits being in alignment and having their respective other ends spaced from each other by an amount less than that wherein laminar flow changes to turbulent flow; a piston is disposed in the spacing between the conduits and has a transverse fluid channel capable of being selectively aligned with the conduits in accordance with the displacement of the piston; and an actuator is coupled to the piston to exert a force thereon.

BRIEF DESCRIPTION OF THE DRAWINGS

The following detailed description, which is by way of example, will best be understood in conjunction with the accompanying drawings in which:

FIG. 2 is an exploded view, in perspective, of the fluid switching element illustrated in FIG. 1;

DETAILED DESCRIPTION OF THE DRAWINGS

Figure 1:
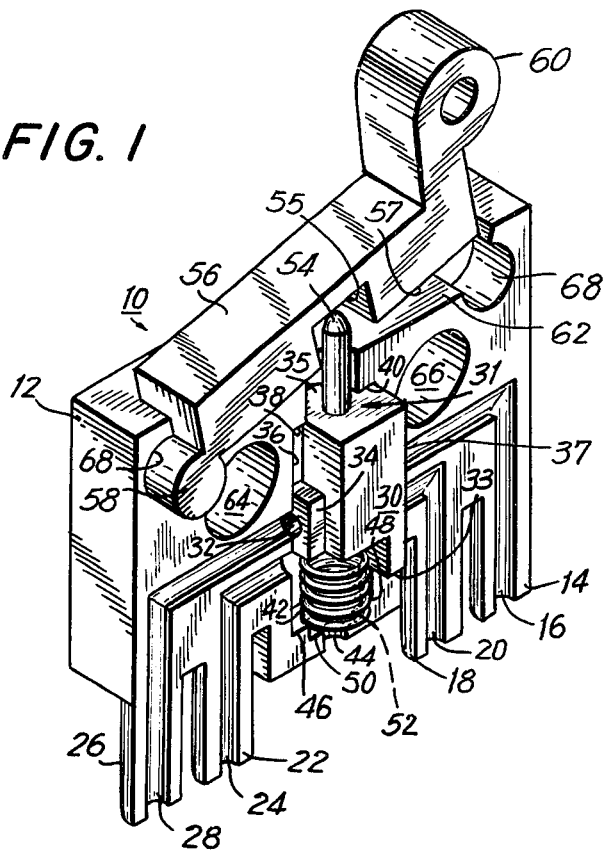
FIG. 1 is a perspective view, in partial section, of one embodiment of a fluid switching element in accordance with the teachings of the present invention.

Referring now to the drawings wherein like reference numerals are used throughout and, in particular, to FIGS. 1 and 2, there is illustrated one embodiment of a fluid switching element in accordance with the present invention. FIG. 1 is a perspective view in partial sectional form, and FIG. 2 is a perspective exploded view. The fluid switching element 10 is comprised of a housing formed of two members 12. To facilitate construction and to minimize manufacturing costs, the two housing members may be substantially identical and may be formed of plastic material. The housing members 12 preferably are of molded construction.

As shown, the housing members 12 are of generally rectangular configuration and are provided with depending legs 14, 18, 22 and 26. These depending legs provide respective conduits 16, 20, 24 and 28 for fluid to flow therethrough. Furthermore, each of these legs terminates in a corresponding port. For the purpose of the present discussion, it will be assumed that the legs 14 and 18 terminate in respective inlet ports and that the legs 22 and 26 terminate in respective outlet ports. As is appreciated, suitable pressure is applied to the inlet ports so that fluid is permitted to flow through the corresponding conduits. If desired, pressure from a first source may be applied through a connecting hose (not shown) to the inlet port at the leg 14, and pressure from a second source likewise can be applied through a connecting hose (not shown) to the inlet port at the leg 18. Alternatively, the respective inlet ports can be connected to a common source of pressure.

In accordance with the aforenoted designation, the conduits 16 and 20 may be considered to be inlet conduits, or passageways, and conduits 24 and 28 may be considered to be outlet conduits, or collectors, respectively. Thus, each of the inlet conduits are connected at one end to an inlet port; and each of the outlet conduits are connected at one end to an outlet port.

The housing members 12 are provided with suitable recesses therein so that, when assembled, these recesses define a cavity 36. As is apparent, the inlet conduit 16 is aligned with the outlet conduit 28, but the respective other ends of these conduits, i.e., the ends opposite the respective ports, are spaced from each other by the gap defined by the cavity. Similarly, the inlet conduit 20 is aligned with the outlet conduit 24, and their respective other ends are separated by the gap defined by the cavity 36.

It is known that, because of the viscosity of a fluid, a fluid will flow through a conduit in laminar flow. It is further known that laminar flow will occur for fluids flowing through a conduit wherein the Reynolds number is about 2000, regardless of the particular parameters of the conduit and fluid. Of course, laminar flow will occur for higher Reynolds numbers under certain conditions. Since the Reynolds number is given by the product of the average fluid velocity and the conduit diameter, divided by the kinetic viscosity of the fluid, it is recognized that laminar flow occurs in the conduits 16, 20, 24 and 28, respectively, by properly selecting the conduit diameter and inlet pressures. It is further known that once laminar flow is obtained, such flow is capable of bridging a "gap" which may be provided in the conduit. This principle permits fluid to flow across a gap between aligned conduits with minimal losses. It has been suggested that this gap can be about 100 times the diameter of the conduit. For a more detailed discussion of this principle, reference is made to "Fluid Amplifiers" by J. H. Kirshner, McGraw-Hill Book Co., 1966; and in particular, pages 235 et seq. thereof. It is this principle which is relied upon for achieving control over the fluid flow between inlet and outlet ports in the illustrated fluid switching element.

The conventional principle of laminar flow is turned to account in the present invention whereby fluid flowing in the inlet conduit 16 can effectively bridge the gap defined by the cavity 36 so as to be collected by the outlet conduit 28. Similarly, substantially all of the fluid flowing in the conduit 20 is collected by the outlet conduit 24 because laminar flow permits the fluid to traverse the cavity 36 with minimal losses. It is a feature of the present invention to provide a valve mechanism 30 so as to selectively enable and disable the flow continuity from inlet conduit 16 to outlet conduit 28 and from inlet conduit 20 to outlet conduit 24, respectively.

The valve mechanism provided in the fluid switching element of the present invention is constituted by an armature, or piston, 31 disposed within the cavity 36 and adapted for displacement therein in a direction substantially normal to the fluid flow direction across the cavity. The piston 31 is provided with a transverse channel 32 therethrough, this transverse channel being selectively aligned with either the conduits 16, 28 or the conduits 20, 24, in accordance with the displacement of the piston 31. As shown, the piston 31 is provided with a boss 34 which is slidable along the wall of the cavity 36 so as to be selectively adjacent the outlet conduits 24, 28 in accordance with the displacement of the piston. The boss prevents pressure from being trapped at the adjacent wall of the cavity 36. The opposite side wall 37 of the piston 31 is slidable along the wall of the cavity 36 and is substantially continuous from the top edge 35 of the piston 31 to a lower shoulder 33 of the piston. It is appreciated that the side wall 37 serves to block one of the inlet conduits 16, 20, while the transverse channel 32 provides a fluid flow path for the other inlet conduit.

In order to provide simplified construction and operation, the piston 31 is capable of selectively assuming a quiescent position and a displaced position, respectively. As viewed in FIGS. 1 and 2, the quiescent position of the piston 31 is assumed when the upper edge 35 thereof is in contact with shoulders 38 and 40 of the housing members 12 in the cavity 36. As illustrated, this is the upper position of the piston 31. The displaced position of the piston is assumed when the lower shoulder 33 thereof is in contact with a mating shoulder 48 located in the cavity in the illustrated depending central structure of the housing members 12. Hence, the upper limit of the piston 31 is attained when the upper edge 35 contacts the shoulders 38 and 40; whereas the lower limit of piston movement is attained when the shoulder 33 of the piston 31 contacts the shoulder 48. A spring 42 is disposed within the cavity 36 and seats on the recess 50, 52 in the housing members 12. This spring applies a suitable spring bias force on the lower edge of the piston 31 so as to urge the piston to assume its quiescent, or upper position, as depicted in FIGS. 1 and 2. This spring bias force is overcome when an external force is applied to an actuating rod 54 which is coupled to the upper edge 35 of the piston 31. This external force, if greater than the spring bias force, is seen to drive the piston 31 to its displaced, or lower position. To facilitate the displacement of the piston 31, a venting port 44 is provided in the lower wall of the recess 50, 52 of the housing members 12 so as to provide communication between the cavity 36 and ambient. More importantly, the venting port 44 permits venting or escape of the pressure that might be trapped in, for example, the conduit 24 when the piston 31 assumes its quiescent position, or that might be trapped in the conduit 28 when the piston assumes its displaced position. It is seen that pressure which might be trapped between the surface of the piston and the walls of the cavity 36 also can escape through this venting port 44. Hence, three-way operation of the illustrated switching element can be attained.

An important feature of the present invention is the omission, or avoidance, of positive sealing elements between the piston 31, the walls of the cavity 36 and the respective conduits 16, 20, 24 and 28. It has been found that the use of such sealing elements produce frictional forces with the walls of the piston 31. Accordingly, to overcome such frictional forces, it would be necessary to apply a higher external force. However, by the present invention, such sealing elements are not used and, therefore, the minimum actuation force which is necessary to displace the piston 31 is substantially reduced. Such minimum actuation force is dependent upon the bias force exerted by the spring 42, the ambient pressure and the pressures applied to the inlet ports. For the case wherein the applied pressures are within the range 0 to 25 psig, the minimum actuation force necessary for displacing the piston 31 is within the range 1 to 20 grams.

It is appreciated that, in the absence of positive sealing elements, there is some fluid leakage. However, this leakage, or fluid consumption, does not significantly affect the operation of the fluidic system in which the illustrated fluid switching element is used. This is because when the piston 31 is in its quiescent, or upper, position, as shown, the transverse channel 32 serves to bridge the cavity 36 and provide a flow path between the inlet conduit 16 and the outlet conduit 28. Since the fluid flows through these conduits in laminar flow, there is negligible fluid loss at the interface between the conduit 16 and the piston 31, and at the interface between the piston and the conduit 28. At the same time, the side wall 37 of the piston 31 is adjacent the inlet conduit 20. The presence of this side wall effectively blocks the flow of fluid to the outlet conduit 24. Although some fluid consumption might be expected at the interface between the side wall 37 and the inlet conduit 20, this is of only minor importance. It is far more significant that no fluid flows to the outlet conduit 24, and that negligible pressure is applied thereto. Thus, if further devices, not shown, are in communication with the outlet conduit 24, such further devices will not sense a fluid flow. However, a fluid flow is sensed by further devices which might be in communication with the outlet conduit 28. This, of course, is the desirable function of the fluid switching element.

It is appreciated that the actuating rod 54 may be furnished with an actuation force by way of any suitable device. For example, an external element might be disposed to contact the rod 54 so as to drive the piston 31 to its displaced position. Such external element may comprise an electromagnetic device, such as a solenoid. It is recognized by those of ordinary skill in the art that, when energized, the movable element of the solenoid will be extended to contact the rod 54 and thus drive the piston 31 to its displaced position. When de-energized, the solenoid permits the piston 31 to return to its illustrated quiescent position. Of course, if desired, the opposite results can be achieved. That is, the solenoid can be of the type wherein the movable element thereof normally is extended so that the piston 31 normally assumes its displaced position. Upon energizing the solenoid, the movable element thereof will retract and thus permit the spring bias force to urge the piston 31 to its quiescent position.

An alternative embodiment of a suitable actuator which can be used to exert a force on the actuating rod 54 is illustrated. As shown, the actuator may comprise a lever 56 which is pivotally mounted within a recess disposed in the top portion of the housing members 12. This pivotal mounting is formed of a stud 58 secured to, and preferably integrally formed with, the lever 56. The stud is positioned in mating holes 68 at the upper portion of the housing members 12. A mounting pin 59 extends from the stud 58 and is received by a corresponding hole 59' in the housing member so as to permit pivotal motion whereby the lever 56 swings about the stud 58 and pin 59. When the housing member 12 are joined to complete the housing structure, the lever 56 is securely clamped therein.

The actuating lever 56 is provided with a recess 55 within which the actuating rod 54 extends. Hence, when the lever 56 pivots about the stud 58 and pin 59, it is appreciated that a force is exerted thereby on the actuating rod 54 in a direction to drive the piston 31 to its displaced position. To this effect, the actuating lever 56 is provided with an actuation head 60 which, in the illustrated embodiment, extends upward from the lever to receive an external force. Thus, it is seen that when a force is exerted on the actuation head 60, the lever 56 pivots about the stud 58 so as to drive the piston 31 to its displaced position. When the force is removed from the actuation head 60, the spring bias force exerted on the piston 31 restores the piston to its quiescent position, and this return movement of the actuating rod 54 forces the lever 56 to swing about the stud 58 in an opposite direction. The illustrated fluid switching element then is prepared for a subsequent actuation.

To facilitate the incorporation of the illustrated fluid switching element in a fluidic system, suitable mounting holes 64, 66 extend through the housing members 12 so as to permit support members, such as screws, to mount the switching element in any desired configuration. Of course, if desired, alternative mounting means may be provided.

The operation of the illustrated fluid switching element now should be readily apparent. When a force, such as the minimum actuation force, is exerted on the actuation rod, as by the energization of a solenoid, or any other external member, or if the force is exerted on the actuation head 60 of the lever 56, the piston 31 is driven to its displaced position. In that event, a fluid flow path extends from the inlet conduit 20, through the transverse channel 32 to the outlet conduit 24. At the same time, the side wall 37 of the piston 31 blocks the flow of fluid through the conduit 16. Hence, the normal flow path from the inlet conduit 16 to the outlet conduit 28 is blocked, or interrupted. Of course, when a force no longer is applied to the actuation rod 54, the spring bias force exerted by the spring 42 returns the piston 31 to its quiescent position so as to restore the fluid flow path from the conduit 16, through the transverse channel 32 to the outlet conduit 28. In this quiescent position, the side wall 37 of the piston 31 serves to block, or interrupt, the fluid flow path from the inlet conduit 20 to the outlet conduit 24. Thus, it is appreciated that, depending upon whether a common source of fluid is coupled to both inlet conduits 16, 20, or whether individual sources of fluid are coupled thereto, the fluid switching element 10 is adapted to operate as a fluid steering switch, a selector switch, a latching switch, or the like.

Figure 3:
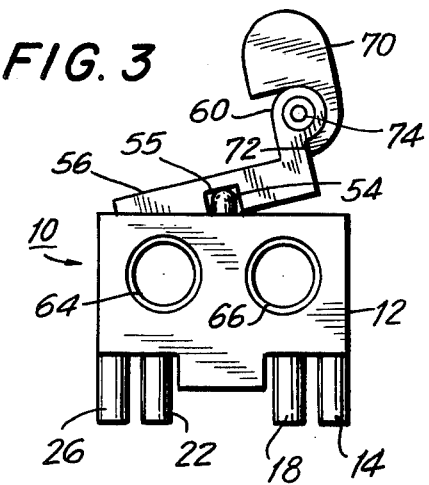
FIG. 3 is a side elevational view of another embodiment of a fluid switching element in accordance with this invention.

Alternative embodiments of the actuator mechanism which can be used with the fluid switching element of the present invention now will be described. With specific reference to FIG. 3, the actuating mechanism includes a roller element 70 pivotally mounted on the actuating head 60 at a pivot axis 74. It is seen that the roller element 70 includes an inner surface which is colateral with the surface of the actuating head 60. In addition, the roller element includes a cam surface 72 in abutment with the neck portion of the actuating head 60. Preferably, the roller element 70 is spring biased such that the cam surface 72 normally abuts the neck portion of the actuating head.

In this construction, it is appreciated that if a force is exerted on the roller element 70 in the right-to-left direction, the roller element 70 merely pivots about the pivot axis 74. Such rotation of the roller element 70 does not cause the lever 56 to swing about the stud 58. However, if the force exerted on the roller element 70 is in the left-to-right direction, it is seen that the cam surface 72 abuts the neck portion of the actuating head 60 so as to prevent the roller element from pivoting about the pivot axis 74. Consequently, this exerted force causes the lever 56 to pivot about the stud 58 so as to exert a corresponding force on the actuating rod 54, thereby driving the piston 31 to its displaced position. Accordingly, the roller element 70 comprises a "one-way" roller which can be used, in cooperation with the fluid switching element 10, to detect the direction of movement of devices, not shown. Also, in combination with other fluidic switching elements, the embodiment shown in FIG. 3 can be used to count the number of devices which are moved therepast in a predetermined direction.

Figure 4:
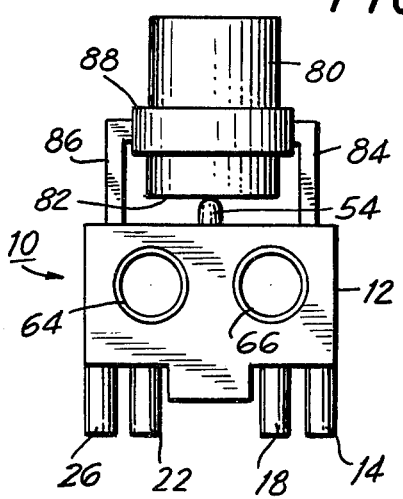
FIG. 4 is a side elevational view of a still further embodiment of a fluid switching element in accordance with this invention.

In the alternative actuator mechanism depicted in FIG. 4, the actuating rod 54 is driven in response to a push-button 80. As shown, suitable side supports 84 and 86 extend upward from the upper portion of the housing members 12 to support a collar 88 therebetween. The push-button 80 is supported within the collar 88 and is adapted for bidirectional movement. In the orientation shown, when the push-button is depressed, the lower surface 82 thereof exerts an actuation force on the actuating rod 54 to thereby drive the piston 31 to its displaced position. When the force applied to the push-button 80 is removed, the bias force exerted on the piston 31 by the spring 42 returns the piston to its quiescent position and restores the actuation rod 54 and push-button 80 to their positions, as illustrated.

It is appreciated that the construction of the housing members 12 permits the very same configuration thereof to be used for each of the described embodiments. This, of course, mimizes the cost of manufacture, yet enables a wide variety of alternative embodiments to be realized.

While the present invention has been shown and described with reference to preferred embodiments thereof, various alternatives and modifications are contemplated. For example, although the fluid switching element is adapted to receive fluid under a pressure in the range of 0 to 25 psig, the preferred range of operating pressure is 0 to 10 psig. Also, it is appreciated that the respective depending legs 14, 18, 22 and 26 can be omitted. Thus, the respective conduits merely can extend longitudinally between the end walls of the housing members 12. Suitable legs may extend from these end walls to permit conventional fluid coupling elements to be connected to the respective inlet and outlet conduits. This, of course, is the purpose of the depending legs which are shown in the drawings.

As a further modification, the depending central structure of the housing members 12 may be omitted. It is appreciated that this depending structure serves as a suitable support for the spring 42. Moreover, this structure is capable of accommodating the lower portion of the piston 31 when the piston is driven to its displaced position. Accordingly, it is appreciated that suitable dimensioning of the cavity 36 and the piston, and the relative locations of the conduits, will provide equivalent support for the spring 42 and equivalent accommodation of the piston 31.

As a further alternative, only one set of ports interconnected by a single conduit (having a gap therein defined by the cavity 36) may be provided. That is, the inlet conduit 20 and outlet conduit 24 may be omitted. This modification of the fluid switching element is analogous to a single-pole single-throw electrical switch.

Although not specifically described hereinabove, it is appreciated that the respective inlet and outlet conduits preferably have a circular cross-section. Of course, other geometric configurations can be used, if desired, provided laminar flow occurs therein. The piston 31 is depicted, in the drawings, as being a substantially rectangular block. Of course, if desired, other cross-sectional shapes, such as circular, can be used.

Therefore, it will be obvious to those of ordinary skill in the art that the foregoing and various other changes and modifications in form and details may be made without departing from the spirit and scope of the invention. It is intended that the appended claims be interpreted as including all such changes and modifications.

What is claimed is:

1. A fluid switch comprising:
a housing having first and second pairs of ports, a predetermined one of each of said pairs of ports having a fluid applied thereto under pressure;
a cavity in said housing, and a venting port in communication with said cavity;
first and second conduits extending between said first and second pairs of ports, respectively, the diameters of said conduits, and the pressure and viscosity of said fluid being such that the Reynolds number is approximately 2000, whereby fluid flows through said conduits in laminar flow, each of said conduits having a gap therein determined by said cavity intermediate said respective pairs of ports, the length of each gap being less than that wherein said laminar flow becomes turbulent;
a piston movable in said cavity in the absence of separate sealing means and in response to a force exerted thereon and having a transverse channel therethrough, said channel being selectively alignable with said first and second conduits in accordance with the displacement of said piston;
an actuator responsive to a minimum actuation force to exert a force on said piston and cause said piston to be displaced; and
a bias spring disposed in said cavity for exerting a bias force on said piston so as to maintain said piston in a quiescent position in the absence of said minimum actuation force, whereby said transverse channel is aligned with said first conduit.

2. The fluid switch of claim 1 wherein said fluid pressure applied to a port is in the range of 0 to 25 psig.

3. A fluid switching element comprising:
a housing formed of first and second members defining a cavity therebetween and having a pair of ports, one of said ports having a fluid pressure applied thereto, said housing having a venting port for enabling said cavity to communicate with ambient;
a conduit disposed within said housing and extending between said ports for fluid to flow therethrough, the diameter of said conduit being of sufficient dimension with the pressure and viscosity of said fluid such that laminar flow occurs, said conduit having a gap therein determined by said cavity and across which said fluid flows in laminar flow;

a piston disposed in said cavity in the absence of separate sealing means and having a transverse channel selectively alignable with said conduit, said piston being biased to a quiescent position and being actuated to a displaced position, one of said quiescent and displaced positions having said channel in alignment with said conduit; and a lever pivotally mounted in said housing and having an actuating head externally of said housing for receiving a minimum actuation force to swing said lever about said pivot mount and thereby exert a force on said piston to displace same from said quiescent position to said displaced position.

4. The fluid switching element of claim 3 wherein said actuating head has a spring biased roller element thereon, said roller element having a cam surface in abutment with said actuating head so as to cause said actuating head and said lever to swing about said pivot mount when a force is exerted on said roller element in a first direction, said roller element being rotated with respect to said actuating head when a force is exerted thereon in a second, opposite direction.

5. A fluid switching element comprising:
a housing formed of first and second members defining a cavity therebetween and having a pair of ports, one of said ports having a fluid pressure applied thereto, said housing having a venting port for enabling said cavity to communicate with ambient;

a conduit disposed within said housing and extending between said ports for fluid to flow therethrough, the diameter of said conduit being of sufficient dimension with the pressure and viscosity of said fluid such that laminar flow occurs, said conduit having a gap therein determined by said cavity and across which said fluid flows in laminar flow;

a piston disposed in said cavity in the absence of separate sealing means and having a transverse channel selectively alignable with said conduit, said piston being biased to a quiescent position and being actuated to a displaced position, one of said quiescent and displaced positions having said channel in alignment with said conduit; and an actuator responsive to a minimum actuation force to thereby exert a force on said piston to displace same from said quiescent position to said displaced position, said actuator including electromagnetic means for causing said piston to displace when energized.

6. A fluid switch, comprising:
a housing having a cavity therein;
at least one inlet port and at least one outlet port in said housing, said inlet port receiving fluid of predetermined kinetic viscosity and pressure;
an inlet conduit in said housing coupled at one end to an inlet port through which fluid flows in response to said pressure, said inlet conduit having a predetermined diameter to permit said fluid having said predetermined kinetic viscosity and pressure to flow therethrough in laminar flow;
an outlet conduit in said housing aligned with said inlet conduit and coupled at one end to an outlet port, said outlet conduit having said predetermined diameter, said inlet and outlet conduits having respective other ends communicating with said cavity and spaced from each other by a gap defined by said cavity, said gap being less than that wherein said laminar flow changes to turbulent flow;

a piston movable in said cavity in response to a force exerted thereon and having a transverse channel therethrough, said channel having said predetermined diameter, and said piston being movable to selectively align said transverse channel with said inlet and outlet conduits so that said laminar flow passes therethrough, said piston having one wall through which said transverse channel passes, said one wall being slidable along the wall of said cavity to selectively block said inlet conduit, and said piston having a boss on another wall opposite to said one wall and through which said transverse channel passes, said boss being of limited dimension and slidable along the wall of said cavity to selectively position said transverse channel therein in alignment with said outlet conduit, said piston additionally having an upper edge and a lower shoulder;

said cavity being provided with a first shoulder to contact said piston upper edge and a second shoulder to contact said piston lower shoulder, thereby to determine the selective alignment of said transverse channel with said inlet and outlet conduits; and means for exerting a force on said piston to selectively urge said upper edge against said first shoulder and said lower shoulder against said second shoulder.

7. The fluid switch of claim 6 wherein said housing is provided with two inlet ports and two outlet ports, and further comprising a second inlet conduit coupled at one end to the second inlet port, said second inlet conduit having a diameter equal to said predetermined diameter; and a second outlet conduit coupled at one end to the second outlet port and being aligned with said second inlet conduit, the diameter of said second outlet conduit being equal to said predetermined diameter; said second inlet and outlet conduits having respective other ends communicating with said cavity and spaced from each other by said gap; and wherein said one wall of said piston blocks said second inlet conduit while said boss is spaced from said second outlet conduit when said transverse channel is in alignment with the first inlet and outlet conduits, and said one wall of said piston blocks the first inlet conduit while said boss is spaced from the first outlet conduit when said transverse channel is in alignment with said second inlet and outlet conduits.

8. The fluid switch of claim 7 further comprising a bias spring positioned in said cavity to bias said piston such that said piston upper edge contacts said first shoulder of said cavity to position said transverse channel in alignment with said first inlet and outlet conduits.

9. The fluid switch of claim 8 wherein said force exerting means comprises a pin on said piston extending externally of said housing; and a movable arm juxtaposed said pin and coupled to said housing for engaging said pin to move said piston from its biased position to a position such that said piston lower shoulder contacts said second shoulder of said cavity to position said transverse channel in alignment with said second inlet and outlet conduits.

* * * * *